(12) United States Patent
Fan et al.

(10) Patent No.: US 10,880,595 B2
(45) Date of Patent: Dec. 29, 2020

(54) METHOD AND APPARATUS FOR ADJUSTING VIRTUAL REALITY SCENE, AND STORAGE MEDIUM

(71) Applicant: TENCENT TECHNOLOGY (SHENZHEN) COMPANY LIMITED, Shenzhen (CN)

(72) Inventors: Shaoting Fan, Shenzhen (CN); Miao Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 68 days.

(21) Appl. No.: 16/206,156

(22) Filed: Nov. 30, 2018

(65) Prior Publication Data

US 2019/0098372 A1   Mar. 28, 2019

Related U.S. Application Data

(63) Continuation of application No. PCT/CN2017/100988, filed on Sep. 8, 2017.

(30) Foreign Application Priority Data

Sep. 19, 2016 (CN) .......................... 2016 1 0829939

(51) Int. Cl.
*H04N 21/431* (2011.01)
*H04N 21/81* (2011.01)
(Continued)

(52) U.S. Cl.
CPC ... *H04N 21/4312* (2013.01); *H04N 21/23418* (2013.01); *H04N 21/44008* (2013.01);
(Continued)

(58) Field of Classification Search
CPC .......... H04N 21/8153; H04N 21/4312; H04N 21/47202; H04N 21/23418; H04N 21/44008; A63F 2300/8082
See application file for complete search history.

(56) References Cited

U.S. PATENT DOCUMENTS

2017/0076498 A1*  3/2017 Dakss ................. H04N 21/812
2017/0150139 A1*  5/2017 Lee ..................... H04N 13/356
(Continued)

FOREIGN PATENT DOCUMENTS

CN        103823549 A      5/2014
CN        105163191 A     12/2015
(Continued)

OTHER PUBLICATIONS

The World Intellectual Property Organization (WIPO) International Search Report for PCT/CN2017/100988 dated Dec. 13, 2017 6 Pages (including translation)
(Continued)

*Primary Examiner* — Pankaj Kumar
*Assistant Examiner* — Alexander Boyd
(74) *Attorney, Agent, or Firm* — Anova Law Group, PLLC

(57) ABSTRACT

The present disclosure discloses a method for adjusting a virtual reality (VR) scene. The method includes pre-storing a plurality of VR theme-scenes, and determining feature information corresponding to the VR theme-scenes; obtaining a movie and television work selected by a user to be played. The method also includes determining feature information of the selected movie and television work; and determining a VR theme-scene corresponding to the selected movie and television work from the plurality of VR theme-
(Continued)

scenes, according to the feature information of the selected movie and television work and the feature information of the VR theme-scene.

20 Claims, 6 Drawing Sheets

(51) Int. Cl.
    *H04N 21/472*     (2011.01)
    *H04N 21/44*     (2011.01)
    *H04N 21/234*     (2011.01)

(52) U.S. Cl.
    CPC ... *H04N 21/47202* (2013.01); *H04N 21/8153* (2013.01); *A63F 2300/8082* (2013.01)

(56) References Cited

U.S. PATENT DOCUMENTS

| | | | |
|---|---|---|---|
| 2017/0206708 A1* | 7/2017 | Gentilin | G06T 19/006 |
| 2017/0345195 A1* | 11/2017 | Eatedali | G06T 11/60 |
| 2018/0218710 A1* | 8/2018 | Park | G09G 5/00 |

FOREIGN PATENT DOCUMENTS

| | | |
|---|---|---|
| CN | 105704501 A | 6/2016 |
| CN | 105929959 A | 9/2016 |

OTHER PUBLICATIONS

The State Intellectual Property Office of the People's Republic of China (SIPO) Office Action 1 for 201610829939.8 dated Jul. 28, 2017 11 Pages (including translation).

* cited by examiner

METHOD AND APPARATUS FOR ADJUSTING VIRTUAL REALITY SCENE, AND STORAGE MEDIUM

RELATED APPLICATIONS

This application is a continuation application of PCT Patent Application No. PCT/CN2017/100988, filed on Sep. 8, 2017, which claims priority to Chinese Patent Application No. 201610829939.8, entitled "METHOD AND APPARATUS FOR ADJUSTING VIRTUAL REALITY SCENE" filed on Sep. 19, 2016, content of all of which is incorporated by reference in its entirety.

FIELD OF TECHNOLOGY

This application relates to the field of virtual reality (VR) and, particularly, to a method and an apparatus for adjusting a VR scene, and a storage medium.

BACKGROUND

Currently, the virtual reality (VR) technology is one of the cutting-edge technologies that attract most attention. Led by some world-class technology corporate giants, the VR technology is currently under rapid development. The VR technology is also referred to as an artificial environment, and is defined to be a computer simulation system developed by integrating technologies in a plurality of fields, such as simulation technologies, computer graphics, man-machine interface technologies, multimedia technologies, sensing technologies, and network technologies, and can create and enable a user to experience what originally occurs only in a real world. In short, the VR technology can bring perception of a user into a virtual world created by the VR technology, and make the user believe that everything in front of the user is real.

However, the current VR technology often lack ways to automatically adjust virtual reality scenes. The disclosed methods and systems are directed to solve one or more problems set forth above and other problems.

SUMMARY

An embodiment of the present disclosure provides a method for adjusting a virtual reality (VR) scene. The method includes pre-storing a plurality of VR theme-scenes, and determining feature information corresponding to the VR theme-scenes; obtaining a movie and television work selected by a user to be played. The method also includes determining feature information of the selected movie and television work; and determining a VR theme-scene corresponding to the selected movie and television work from the plurality of VR theme-scenes, according to the feature information of the selected movie and television work and the feature information of the VR theme-scene.

Another embodiment of the present disclosure further provides an apparatus for adjusting a virtual reality (VR) scene. The apparatus includes one or more memories storing computer instructions; and one or more processors coupled to the memories. When executing the computer instruction, the processors are configured to perform: pre-storing a plurality of VR theme-scenes, and determining feature information corresponding to the VR theme-scenes; obtaining a movie and television work selected by a user to be played; determining feature information of the selected movie and television work; and determining a VR theme-scene corresponding to the selected movie and television work from the plurality of VR theme-scenes, according to the feature information of the selected movie and television work and the feature information of the VR theme-scene.

Other aspects of the present disclosure can be understood by those skilled in the art in light of the description, the claims, and the drawings of the present disclosure.

BRIEF DESCRIPTION OF THE DRAWINGS

To describe the technical solutions of the present disclosure more clearly, the following briefly introduces the accompanying drawings for describing the embodiment. Apparently, the accompanying drawings in the following description show only some embodiments of the present disclosure, and a person of ordinary skill in the art may derive other drawings from these accompanying drawings without creative efforts.

DETAILED DESCRIPTION

The following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the described embodiments of the present disclosure without creative efforts shall fall within the protection scope of the present disclosure.

In an existing VR system, to improve the play effect of movie and television work, in addition to the movie and television work, such as movies, the VR system further provides a light-and-shadow theme that can be played together with a movie being played, such as a 360-degree panoramic picture, to form a surround panoramic movie watching hall. In the present disclosure, this light-andshadow theme is referred to as a VR theme-scene. If a movie being played matches a VR theme-scene well, the VR theme-scene fosters the environment and the atmosphere of the movie, so that the movie is more vivid, and more easily brings a user into a virtual world, thereby increasing the immersion of the user. For example, if the movie is a horror movie, matching the horror movie against a spooky VR theme-scene can better foster the horrible atmosphere of the movie, thereby improving the movie watching effect.

However, in the existing VR application, to select a VR theme-scene, a user usually first selects a to-be-played movie, and then a plurality of VR theme-scenes are provided for selection by the user. However, if the user does not know the content of the movie, it is usually difficult to select an appropriate VR theme-scene matching the movie. Consequently, the play effect is greatly discounted. In addition, providing a link for selecting a VR theme-scene by the user also adds an operating step of the user and increases loss of the computer performance of the VR system.

According to the present disclosure, the VR system automatically adapts a theater scene, changes color matching, and/or configures a scene atmosphere event according to features of a movie being played and television work. In this way, the user is immersed into the movie and television work from perception while reducing the operation steps of selecting a theme-scene before watching the VR movie, thereby greatly improving user experience.

Figure 1:
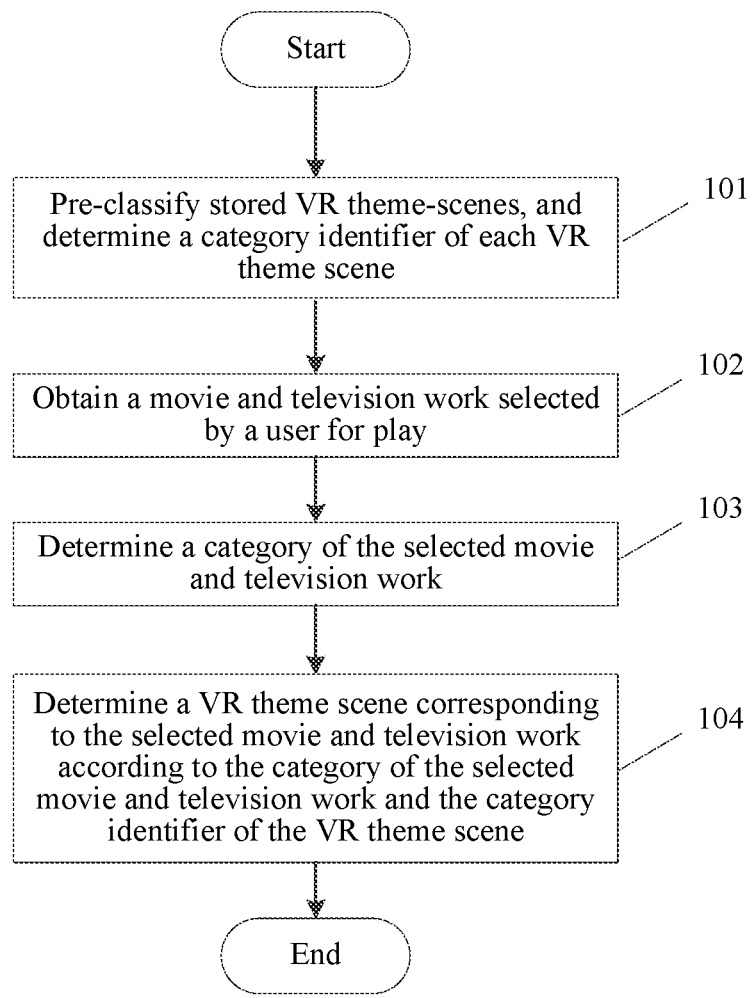
FIG. 1 is a schematic flowchart of a method for adjusting a VR scene according to an embodiment of the present disclosure.

In an embodiment of the present disclosure, a method is provided for adjusting a VR scene. As shown in FIG. 1, the method includes the following.

Step 101: Pre-classifying stored VR theme-scenes, and determining a category identifier of each VR theme-scene.

As stated above, to improve the play effect of a movie and television work, some VR theme-scenes are stored in a database of a VR system. In one embodiment of the present disclosure, VR theme-scenes not only need to be stored, but also need to be classified according to light and shadow effects of the VR theme-scenes, and a category identifier corresponding to each VR theme-scene is stored in the database, so as to form a classification mechanism of the VR theme-scenes.

The VR theme-scenes may be classified according to categories for classifying movie and television work. For example, the VR theme-scenes may also be classified into: categories such as horror movies, comedies, and romantic movies.

Usually, each type of the movie and television work may have only one unique corresponding VR theme-scene. Certainly, each type of the movie and television work may also have a plurality of corresponding VR theme-scenes.

In addition, the classification mechanism of the VR theme-scenes formed by classifying the VR theme-scenes may facilitate automatic adaptive classification of VR theme-scenes uploaded by a user in a later time. In addition, this classification mechanism may also be applied to classification of movie and television work.

Step 102: Obtaining a movie and television work selected by a user to be played.

In one embodiment of the present disclosure, a user may select a to-be-played movie and television work from a local database or a network database by using a user interface provided by the VR system. For example, the user may select the to-be-played movie and television work by means of basic operations, such as a touchscreen or a voice, provided by the VR system.

Step 103: Determining a category of the selected movie and television work.

In this example, a movie and television work stored in either the local database or the network database of the VR system includes a category identifier of the movie and television work. The category identifier is used to identify a category of a movie and television work, such as identifying a movie to be a comedy, a horror movie, or a romantic movie. Usually, narrative elements of movie and television work having a same category identifier have a particular similarity therebetween. Usually, when a movie and television work is issued, a producer thereof provides a determined category of the movie and television work according to scenes, emotions, or forms of the movie and television work. Movie and television work that are not classified may also be pre-classified by means of manual identification. For example, classification may be performed by using a classification mechanism the same as that of the VR theme-scenes.

Step 104: Determining a VR theme-scene corresponding to the selected movie and television work according to the category of the selected movie and television work and the category identifier of the VR theme-scene.

Specifically, in this step, after the category of the selected movie and television work is determined, a VR theme-scene having a category the same as that of the selected movie and television work may be selected from VR theme-scenes stored in a database. That is, the category of the selected movie and television work should be the same as the category of the VR theme-scene corresponding to the selected movie and television work.

For example, as stated above, the movie and television work may be classified into categories such as comedies and horror movies. The VR theme-scenes may also be classified into categories such as comedies and horror movies according to the classification method, to correspond to the categories of the movie and television work. In this way, if the movie selected by the user for play is a horror movie, the type of the VR theme-scene determined by the VR system should also be a horror movie.

Further, if there is only one VR theme-scene with a same category, that is, the number is 1, the VR system may directly use the VR theme-scene as the VR theme-scene corresponding to the selected movie and television work; and if there are a plurality of VR theme-scenes with a same category, that is, the number is greater than 1, the VR system may randomly determine a VR theme-scene therefrom as the VR theme-scene corresponding to the selected movie and television work. For example, if the movie selected by the user for play is a horror movie, and the VR system stores a plurality of VR theme-scenes of horror movies, the VR system randomly determines a VR theme-scene therefrom as the VR theme-scene corresponding to the selected movie and television work.

Furthermore, if there is no VR theme-scene having a same category, the VR theme-scenes and the category identifiers thereof may be provided to the user by using the user interference for selection by the user. In this case, the user may select a VR theme-scene. Certainly, the user may not select any VR theme-scene.

According to the present disclosure, VR theme-scenes corresponding to classification information of movie and television work are intelligently adapted, so that the immersion of a user is increased, and operating steps of selecting a theme-scene before VR movie watching are reduced, thereby greatly improving user experience.

Thus, the foregoing method is a method for automatically adapting a VR theme-scene for a selected movie and television work according to the selected movie and television work. However, in addition to a category, each movie and television work may also include a label that can describe the content or feature thereof in a more detailed manner. In the present disclosure, the label of a movie and television work is similar to a key word describing the content of the movie and television work. Therefore, in another embodiment of the present disclosure, a VR theme-scene may be automatically adapted for a movie and television work according to the label of the movie and television work.

Figure 2:
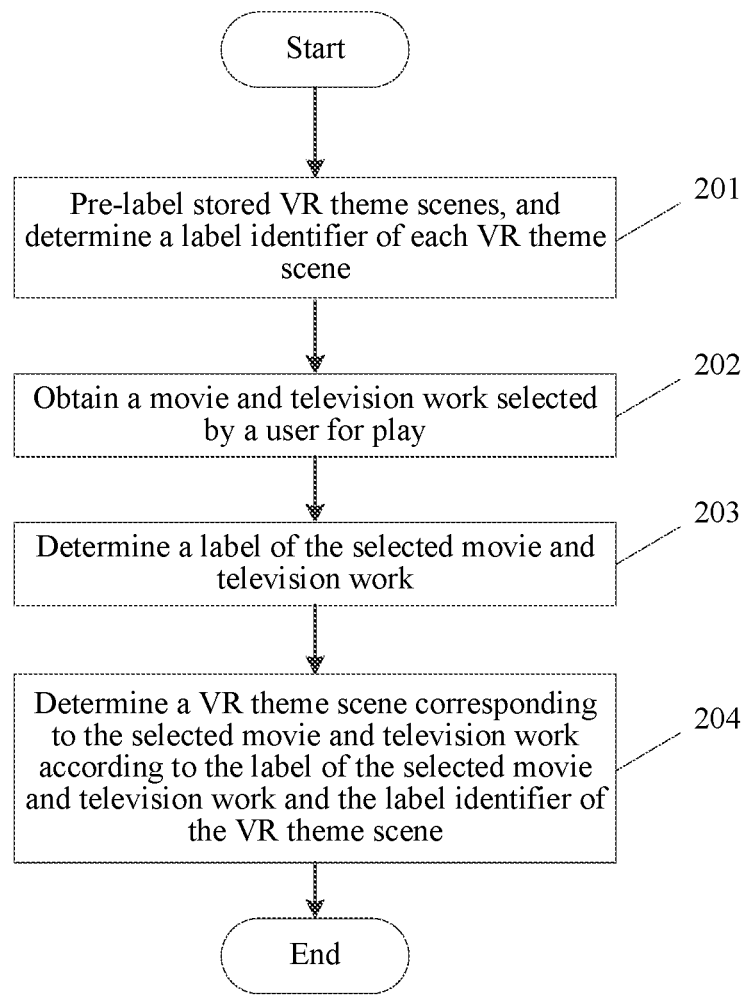
FIG. 2 is a schematic flowchart of another method for adjusting a VR scene according to an embodiment of the present disclosure.

A schematic flowchart of another method for adjusting a VR scene according to an embodiment of the present disclosure is shown in FIG. 2. The method includes the followings.

Step 201: Pre-labeling stored VR theme-scenes, and determining a label identifier of each VR theme-scene.

As stated above, to improve the play effect of a movie and television work, some VR theme-scenes are stored in a database of a VR system. In one embodiment of the present disclosure, VR theme-scenes not only need to be stored, but also need to be labelled according to light and shadow effects of the VR theme-scenes, and a label identifier corresponding to each VR theme-scene is stored in the database, so as to form a labelling mechanism of the VR theme-scenes.

In this step, the VR theme-scenes may be labelled in the manner of labelling movie and television work. The VR theme-scenes are also labelled with labels such as horror, comedy, romance, and love.

Usually, each label of the movie and television work may have only one unique corresponding VR theme-scene. Certainly, each type of the movie and television work may also have a plurality of corresponding VR theme-scenes.

In addition, the formed labelling mechanism of the VR theme-scenes may facilitate automatic labelling of VR theme-scenes uploaded by a user in a later time, and may also be applied to labelling of movie and television work.

Step 202: Obtaining a movie and television work selected by a user to be played.

In one embodiment of the present disclosure, the manner of obtaining the movie and television work selected by the user for play may be the same as the example corresponding to step 102 of FIG. 1, and therefore details are not described herein.

Step 203: Determining a label of the selected movie and television work.

In this example, a movie and television work stored in either the local database or the network database of the VR system includes a label identifier reflecting content key words of the movie and television work. The label identifier is used to identify features of a movie and television work, such as identifying features of a movie to be comedy and horror or romance and love. Usually, narrative elements of movie and television work having a same label have a particular similarity therebetween. Usually, when a movie and television work is issued, a producer thereof provides a determined label of the movie and television work according to scenes, emotions, or forms of the movie and television work. Movie and television work that are not labelled may also be pre-labelled in a manual manner. For example, labelling may be performed by using a labelling mechanism the same as that of the VR theme-scenes.

Step 204: Determining a VR theme-scene corresponding to the selected movie and television work according to the label of the selected movie and television work and the label identifier of the VR theme-scene.

Specifically, in this step, after the label of the selected movie and television work is determined, a VR theme-scene having a label the same as that of the selected movie and television work may be selected from the VR theme-scenes stored in a database. That is, the label of the selected movie and television work should be the same as the label of the VR theme-scene corresponding to the selected movie and television work.

For example, as stated above, the movie and television work may be labelled with labels such as love and comedy. The VR theme-scenes are also labelled with labels such as love and comedy according to the labelling method, to correspond to the labels of the movie and television work. In this way, if the label of the movie selected by the user for play is love and comedy, the label of the VR theme-scene determined by the VR system should also be love and comedy.

Further, if there is only one VR theme-scene with a same label, the VR system may directly use the VR theme-scene as the VR theme-scene corresponding to the selected movie and television work; and if there are a plurality of VR theme-scenes with a same label, the VR system may randomly determine a VR theme-scene therefrom as the VR theme-scene corresponding to the selected movie and television work. For example, if the label of the movie selected by the user for play is horror, and the VR system stores a plurality of VR theme-scenes whose labels are horror, in this case, the VR system randomly determines a VR theme-scene therefrom as the VR theme-scene corresponding to the selected movie and television work.

Furthermore, if there is no VR theme-scene having a same label, the VR theme-scenes and the label identifiers thereof may be provided to the user by using the user interference for selection by the user. Certainly, the VR system may provide, in priority, a VR theme-scene having a similar label to the user for selection, such as providing a VR theme-scene with a label partially the same as that of the selected movie and television work. In this case, the user may select a VR theme-scene. Certainly, the user may not select any VR theme-scene.

According to the present disclosure, VR theme-scenes corresponding to label information of movie and television work are intelligently adapted, so that the immersion of a user is increased, and operating steps of selecting a theme-scene before VR movie watching are reduced, thereby greatly improving user experience.

Figure 3:
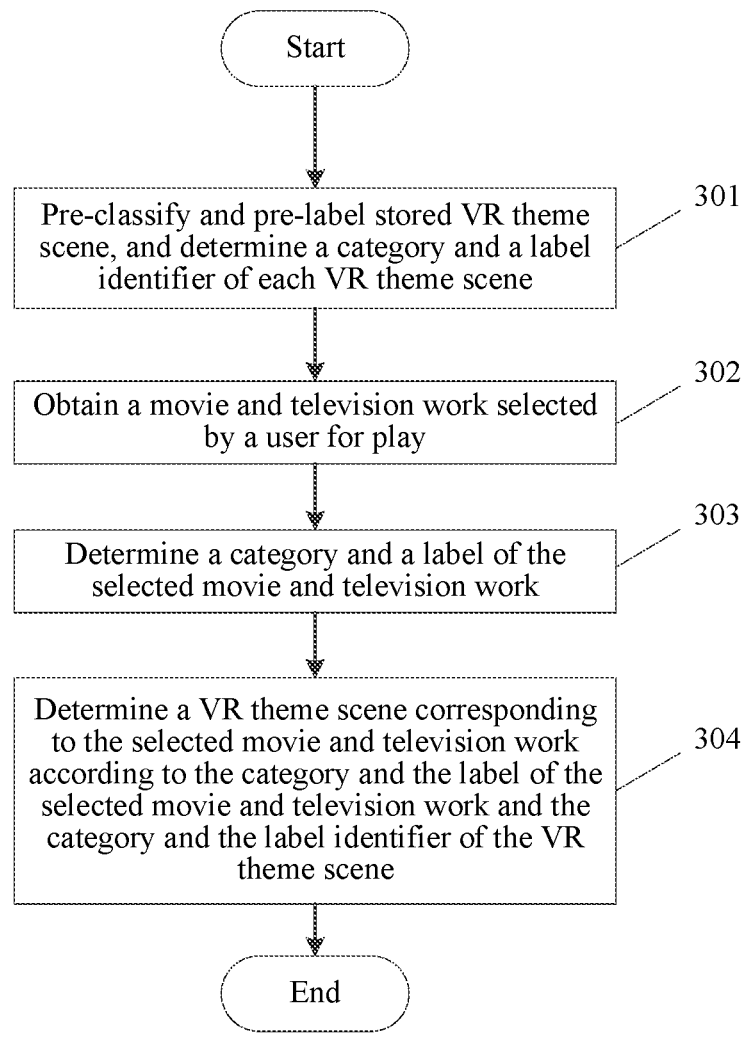
FIG. 3 is a schematic flowchart of another method for adjusting a VR scene according to an embodiment of the present disclosure.

Furthermore, if a VR theme-scene and a to-be-played movie and television work not only include category identifiers but also include labels, automatic adaption between the VR theme-scene and the movie and television work may also be completed according to categories and labels. A schematic flowchart of another method for adjusting a VR scene according to an embodiment of the present disclosure is shown in FIG. 3. The method includes the following.

Step 301: Pre-classifying and pre-labeling stored VR theme-scene, and determining a category identifier and a label identifier of each VR theme-scene.

Reference may be made to the method shown in FIG. 1 and FIG. 2 for the manner of classifying and labelling a VR theme-scene in this step, and therefore details are not described herein again.

Step 302: Obtaining a movie and television work selected by a user for play.

In one embodiment of the present disclosure, the manner of obtaining the movie and television work selected by the user for play may be the same as step 102 shown FIG. 1, and therefore details are not described herein again.

Step 303: Determining a category and a label of the selected movie and television work.

In one embodiment of the present disclosure, reference may also be made to the example corresponding to FIG. 1 and FIG. 2 for the manner of determining the category and the label of the selected movie and television.

Step 304: Determining a VR theme-scene corresponding to the selected movie and television work according to the category and the label of the selected movie and television work and the category and the label identifier of the VR theme-scene.

In some examples, scene selection according to classification information and label information of movie and television work has a priority, and may first select a VR theme-scene having classification information the same as that of the movie and television work, and then select, from these VR theme-scenes, a scene having same label information. That is, first selecting scenes having label information the same as that of the movie and television work, and then selecting, from these scenes, a scene having same classification information, or the like.

For example, if category selecting is in priority, when there are a plurality of VR theme-scenes with a same category, the VR system further determines a VR theme-scene corresponding to the selected movie and television work according to the label of the selected movie and television work and the label identifier of the VR theme-scene. In this case, if labels of all the VR theme-scenes with the same category are not completely the same as the label of the movie and television work, a VR theme-scene with the same category may be randomly selected, or the VR theme-scenes with the same category are provided to the user for manual selection, or the user is asked to manually select a label of a VR theme-scene, and then randomly or manually select a VR theme-scene from VR theme-scenes having the label. However, if there is only one VR theme-scene with a same category, label selecting may be further performed. If the label of the VR theme-scene is different from the label of the selected movie and television work, the user may be asked to perform manual selection; or label selecting is not performed, and the VR theme-scene is directly used as the VR theme-scene corresponding to the movie and television work. The foregoing manner of determining the VR theme-scene corresponding to the selected movie and television work according to the label of the selected movie and television work and the label identifier of the VR theme-scene is the same as the example corresponding to FIG. 2. Details are not described herein.

If label selecting is in priority, if there are a plurality of VR theme-scenes with a same label, the VR system further determines a VR theme-scene corresponding to the selected movie and television work according to the category of the selected movie and television work and the category identifier of the VR theme-scene. If there are still a plurality of VR theme-scenes meeting the condition, one may be randomly selected therefrom. However, if categories of all the VR theme-scenes with the same label are not completely the same as the category of the movie and television work, a VR theme-scene with the same label may be randomly selected, or the VR theme-scenes with the same label are provided to the user for manual selection, or the user is asked to manually select a category of a VR theme-scene, and then randomly or manually select a VR theme-scene from VR theme-scenes having the category. However, if there is only one VR theme-scene with a same label, category selecting may be further performed. If the category identifier of the VR theme-scene is different from the category identifier of the selected movie and television work, the user may be asked to perform manual selection; or category selecting may be not performed, and the VR theme-scene is directly used as the VR theme-scene corresponding to the movie and television work. However, the way for determining the VR theme-scene corresponding to the selected movie and television work according to the category of the selected movie and television work and the category identifier of the VR theme-scene is the same as the example corresponding to FIG. 1. Details are not described herein.

According to the present disclosure, VR theme-scenes corresponding to category and label information of movie and television work are intelligently adapted, so that the immersion of a user is increased, and operating steps for selecting a theme-scene before watching VR movie are reduced, thereby greatly improving user experience.

In the foregoing examples shown in FIG. 1, FIG. 2, and FIG. 3, the VR system may determine a VR theme-scene corresponding to the selected movie and television work according to the category and/or the label of the selected movie and television work and the category and/or the label identifier of the VR theme-scene. The category and/or the label of the movie and television work and the VR theme-scene may be generally referred to as feature information of the movie and television work and the VR theme-scene. The feature information may further include other features that can reflect the differences between the content of each movie and television work or VR theme-scene from the content of another movie and television work or VR theme-scene. That is, by summarizing the foregoing examples shown in FIG. 1, FIG. 2, and FIG. 3, the VR system pre-stores VR theme-scenes, and determines feature information of the VR theme-scenes; then after a user selects a movie and television work to be played, feature information of the movie and television work selected by the user for play is determined; and finally, a VR theme-scene matching the feature information is determined from VR theme-scenes according to the feature information of the movie and television work, and is used as a VR theme-scene of the played movie and television work.

Figure 4:
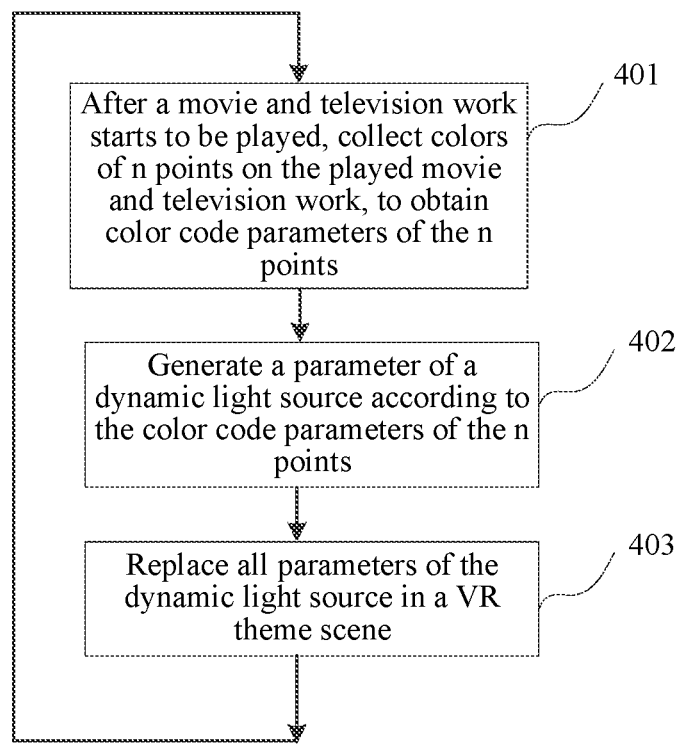
FIG. 4 is a schematic flowchart of a method for adjusting a VR scene according to an embodiment of the present disclosure.

To further improve the movie watching effect and increase the immersion of the user, after the VR theme-scene matching the to-be-played movie and television work is determined, light and shadow colors of the VR theme-scene may further be dynamically adjusted according to light and shadow colors of the played movie. Another embodiment of the present disclosure provides such a method, and an implementation flow thereof is shown in FIG. 4. The method may be applied to a VR theme-scene automatically obtained by using the foregoing method, or may be applied to a VR theme-scene manually selected by the user.

A schematic flowchart of a method for adjusting a VR scene according to an embodiment of the present disclosure is shown in FIG. 4. The method includes the followings.

Step 401: After a movie and television work is played, collecting colors of n points or pixels/subpixels on the played movie and television work, to obtain color code parameters of the n points, where n is a natural number greater than or equal to 2.

The color code parameters may be parameters indicated in the form such as an RGB color value or a hexadecimal color code.

In some examples, the system may collect, in real time, two or more points, such as 4 points, from a movie and television work that is currently played, and separately records color code parameters of colors of these points at each color collection time moment.

For example, the played movie and television work is a love comedy, and color code parameters of 4 points collected therefrom at a particular moment are respectively light pink (hexadecimal # FFB6C1 or RGB 255,182,193), pink (hexadecimal # FFC0CB or RGB 255,192,203), hot pink (hexadecimal # FF69B4 or RGB 255,105,180), and deep pink (hexadecimal # FF69B4 or RGB 255,105,180).

In this example, the actual selection of n may be adjusted according to balance between an effect requirement of software and computer performance. A larger n indicates more collected points, higher continuity of colors formed by the n points, and higher similarity to real colors of a movie and television work. However, higher requirements are also proposed for the computer performance. Therefore, in actual use, the n may be selected according to the balance between the effect requirement of the software and the computer performance.

Step 402: Generating a parameter of a dynamic light source according to the color code parameters of the n points.

In some examples, the VR system may generate the dynamic light source according to the color code parameters of the n points, to obtain the parameter of the generated dynamic light source.

Herein, the generating a parameter of a dynamic light source according to the color code parameters of the n points may be implemented by using existing VR software, such as an engine like Unity 3D or Unreal.

According to the number of color collection points, the generated dynamic light source may be, for example, a point light source, a surface light source, or a spotlight.

For example, as stated above, the color code parameters of 4 points collected therefrom at a particular moment are respectively light pink (hexadecimal # FFB6C1 or RGB 255,182,193), pink (hexadecimal # FFC0CB or RGB 255, 192,203), hot pink (hexadecimal # FF69B4 or RGB 255, 105,180), and deep pink (hexadecimal # FF69B4 or RGB 255,105,180). After obtaining these color code parameters, a VR software module may generate a new dynamic light source, which includes four gradient nodes from light to deep recorded in the color code parameters.

Step 403: Replacing all parameters of the dynamic light source in a current VR theme-scene with the generated parameter of the dynamic light source.

In some examples, by replacing all the parameters of the dynamic light source in the current VR theme-scene with the parameter of the dynamic light source and generated in Step 402, light and shadow colors of the VR theme-scene can be adjusted, so that the colors of the VR theme-scene keep matching the colors of the played movie and television work.

The VR system may periodically execute the foregoing method, that is, periodically collecting colors of n points, periodically generating a parameter of a dynamic light source according to the collected colors of the n points, and replacing the parameters of the dynamic light source in the VR theme-scene with the generated parameter, so that the colors of the VR theme-scene always keep basically consistent with the colors of the movie. A color collection frequency of the VR system may be f, such as 10 hertz. In this example, the actual selection off may be adjusted according to balance between an effect requirement of software and computer performance. A larger f indicates a larger number of times of collection of point colors per unit time, and higher similarity between the light source simulated by the dynamic light source and real colors of a movie and television work. However, higher requirements are proposed for the computer performance. Therefore, in actual use, the f may be selected according to the balance between the effect requirement of the software and the computer performance.

According to the present disclosure, colors matching movie and television work are automatically changed, so that the immersion and realism of the user are increased, and the operating steps of selecting colors for matching by a user before VR movie watching are reduced, thereby greatly enhancing fun and entertainment.

Figure 5:
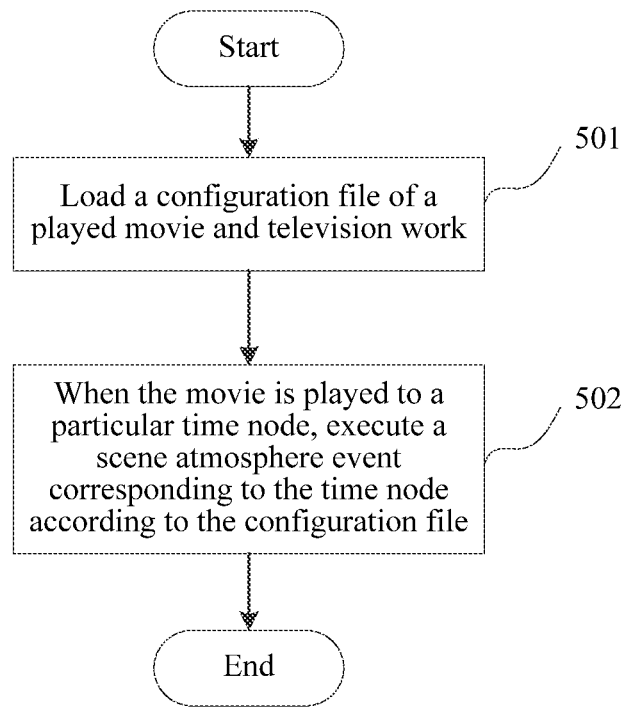
FIG. 5 is a schematic flowchart of another method for adjusting a VR scene according to an embodiment of the present disclosure.

Furthermore, some key or special events such as lightning, earthquake, or zombies usually occur in a movie being played or a movie and television work. To further increase the immersion of the user, and improve the movie watching effect, after the VR theme-scene matching the to-be-played movie and television work is determined, some associated scene atmosphere events may further be defined according to the played movie, to foster the effect of the movie. Another embodiment of the present disclosure provides such a method, and an implementation flow thereof is shown in FIG. 5. The method may be applied to a VR theme-scene obtained automatically using the foregoing method, or may be applied to a VR theme-scene obtained by manual selection by the user.

A schematic flowchart of another method for adjusting a VR scene according to an embodiment of the present disclosure is shown in FIG. 5. The method includes the followings.

Step 501: Loading a configuration file of a movie being played and television work, where the configuration file includes: a time node and a corresponding scene atmosphere event. As used herein, the scene atmosphere event is a phenomenon that occurs in a VR scene and that is displayed in the form such as a fine art material.

The configuration file of the played movie and television work may be loaded before the movie and television work is played, or in the process of playing the movie and television work.

The configuration file may be a scene atmosphere event list (library), including: a time node parameter and a scene event parameter. Usually, the configuration file of the movie and television work may be generated by editing by a service provider of a VR system, a provider of the movie and television work, or even a user.

In some embodiments of the present disclosure, the scene event parameter in the scene atmosphere event list (library) may include use of fine art materials. However, use of fine art materials includes but is not limited to use of special effects, and may also use of resources such as models and actions. For example, a scene event triggered by a time node when a user watches a horror movie may be that a zombie having a model and actions occurs in a movie watching hall, or that scene changes such as strenuous shakes or collapses occur in the scene.

In some embodiments of the present disclosure, the time node may be a moment at which a played important plot of the movie and television work occurs. The selection work of the time node may be completed by the service provider of the VR system, the provider of the movie and television work, or even the user.

For example, assuming that a lightning shot occurs when a movie is played to the 30th minute and the 15th second, an editor of the configuration file may add the following record to the configuration file of the movie: time node: the 30th minute and the 15th second; scene atmosphere event: flash event. Assuming that a kiss scene occurs when a movie is played to the 58th minute and the 35th second, the following record may be added to the configuration file of the movie: time node: the 58th minute and the 35th second; scene atmosphere event: pink bubble event, and the like.

Step 502: When the movie is played to a particular time node, executing the scene atmosphere event corresponding to the time node according to the configuration file.

In this step, when the movie and television work is played to the time node configured in the configuration file, execution of an associated scene atmosphere event is triggered.

For example, as stated above, a lightning shot occurs when a movie is played to the 30th minute and the 15th second, and the configuration file of the movie includes the following record: time node: the 30th minute and the 15th second; scene atmosphere event: flash event. In this way, according to the record in the configuration file, when the movie advances to the 30th minute and the 15th second, a lightning shot occurs in the movie, and the VR system synchronously executes the flash event. At this moment, flash light occurs in the entire movie watching hall. For another example, a kiss scene occurs when a movie is played to the 58th minute and the 35th second, and the configuration file of the movie includes the following record: time node: the 58th minute and the 35th second; scene atmosphere event: pink bubble event. In this way, according to the records in the configuration file, when the movie advances to the 58th minute and the 35th second, a kiss scene occurs in the movie, and the VR system executes the pink bubble event. At this moment, pink bubbles occur in the entire movie watching hall.

As can be learned from the foregoing technical solution, by means of pre-configuration of a scene atmosphere event provided in the present disclosure, other users are enabled to sense shocking 3D atmosphere special effects or related scene events in a VR scene while watching a marked plot, to increase the immersion and realism of the users, thereby greatly enhancing fun and entertainment.

As can be learned from the above, according to the plurality of methods for adjusting a VR scene shown in FIG. 1 to FIG. 5, a VR theme-scene is automatically adapted according to feature information of a movie and television work, color matching of the VR theme-scene is changed, a scene atmosphere event is configured, or the like, so that the user is immersed into the movie and television work from perception. In addition, in one embodiment of the present disclosure, the foregoing different methods may further be combined.

Figure 6:
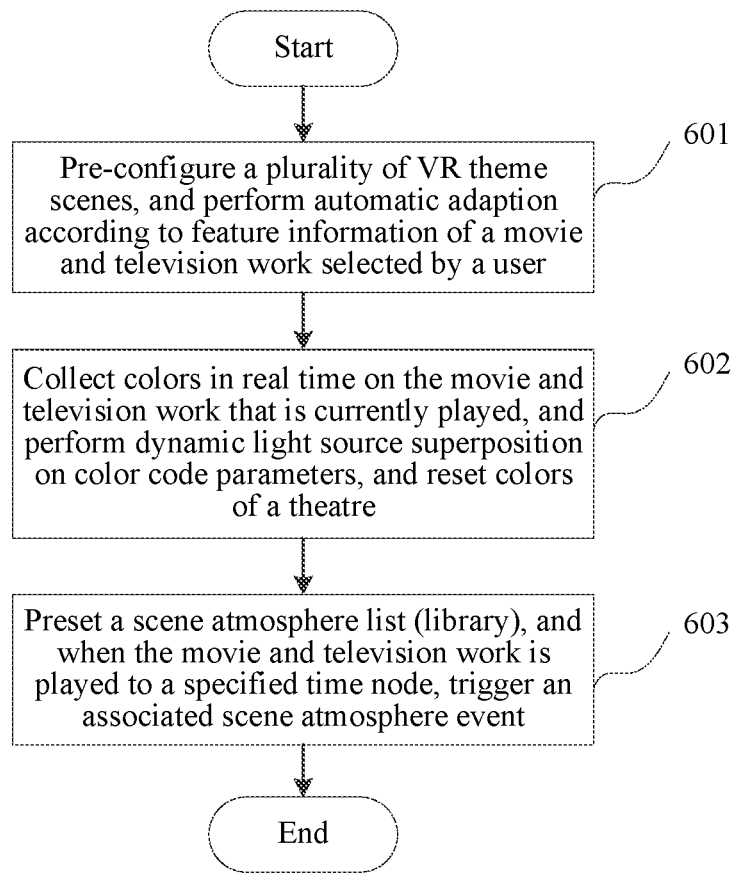
FIG. 6 is a schematic flowchart of another method for adjusting a VR scene according to an embodiment of the present disclosure.

A schematic flowchart of another method for adjusting a VR scene according to an embodiment of the present disclosure is shown in FIG. 6. According to the method, automatic adaption of VR theme-scenes may be combined with the scheme of changing color matching of theme-scenes, and the method includes the followings.

Step 601: Pre-configuring a plurality of VR theme-scenes, and automatically adapting a VR theme-scene matching a selected movie and television work according to feature information of the movie and television work selected by a user.

As stated above, scenes corresponding to movie and television work may be intelligently adapted by using the examples corresponding to FIG. 1 to FIG. 3, that is, step 601 is implemented. Therefore, details are not described in detail herein.

Step 602: Collecting colors in real time on a movie and television work that is currently played, and performing dynamic light source superposition on color codes, and reset colors of a theater.

As stated above, step 602 may be implemented by using the example corresponding to FIG. 4. That is, colors matching a movie and television work are automatically changed. Therefore, details are not described in detail herein.

Based on the foregoing method, the scheme of configuring a scene atmosphere event may further be combined. That is, the foregoing method further includes:

Step 603: According to a configuration file of the played movie and television work, when the movie and television work is played to a specified time node, triggering a scene atmosphere event associated with the time node.

As stated above, step 603 may be implemented by using the example corresponding to FIG. 5. Therefore, details are not described in detail herein.

In addition, if the VR theme-scene is not obtained by automatic adaption in step 601, and instead, is obtained in other manners, such as manual selection by a user, only steps 602 and 603 may alternatively be performed, to change colors of the VR theme-scene and execute a scene atmosphere event, thereby enhancing the immersion and the realism of the user when the user watches a movie and television work in a VR environment.

Based on the foregoing examples, the present disclosure further provides an apparatus for adjusting a VR scene. In some examples, the apparatus for adjusting a VR scene may be implemented by the structure shown in FIG. 7, and includes four functional modules: a storage module 701, a feature information extraction module 702, an obtaining module 703, a first determining module 704, and a second determining module 705.

The storage module 701 is configured to store a VR theme-scene.

The feature information extraction module 702 is configured to determine feature information of the stored VR theme-scene. Further, the feature information includes a category identifier and/or a label.

The obtaining module 703 is configured to obtain a movie and television work selected by a user for play.

The first determining module 704 is configured to determine feature information of the selected movie and television work.

The second determining module 705 is configured to determine a VR theme-scene corresponding to the selected movie and television work according to the feature information of the selected movie and television work and a feature information identifier of the VR theme-scene.

By means of work of the storage module 701, the feature information extraction module 702, the obtaining module 703, the first determining module 704, and the second determining module 705, the apparatus for adjusting a VR scene may complete automatic adaption of the VR theme-scene according to the feature information of the movie and television work.

Further, reference may be made to the method shown in FIG. 1 to FIG. 3 for the specific method for implementing the functions of the foregoing modules. Details are not described herein again.

Figure 8:
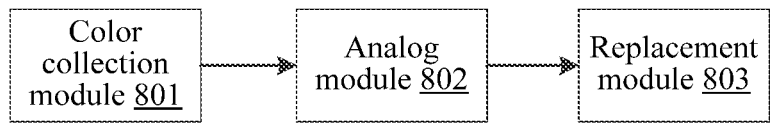
FIG. 8 is a structure diagram of another apparatus for adjusting a VR scene according to an embodiment of the present disclosure.

In addition, to automatically adjust colors of the VR theme-scene, the apparatus may be implemented by the structure shown in FIG. 8, and includes: a color collection module 801, an analog module 802, and a replacement module 803.

The color collection module 801 is configured to collect, in real time, colors of n points on a movie being played and television work, to obtain color code parameters of the n points, n being a natural number greater than or equal to 2.

The analog module 802 is configured to generate a parameter of a dynamic light source according to the color code parameters of the n points.

The replacement module 803 is configured to replace all parameters of the dynamic light source in a current VR theme-scene with the generated parameter of the dynamic light source.

By means of work of the color collection module 801, the analog module 802, and the replacement module 803, the apparatus for adjusting a VR scene may automatically adjust the colors of the VR theme-scene according to colors of the movie and television work.

In the present disclosure, reference may be made to the method shown in FIG. 4 for the specific method for implementing the functions of the foregoing modules. Details are not described herein again.

Figure 9:
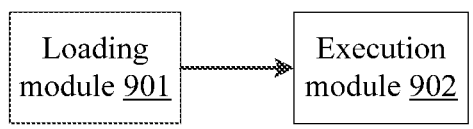
FIG. 9 is a structure diagram of another apparatus for adjusting a VR scene according to an embodiment of the present disclosure.

In addition, to add an atmosphere event synchronous with the played movie and television work to the VR theme-scene, the apparatus may be implemented by the structure shown in FIG. 9, and includes: a loading module 901 and an execution module 902.

The loading module 901 is configured to load a configuration file of the played movie and television work, where the configuration file includes a time node and a corresponding scene atmosphere event.

The execution module 902 is configured to: when the movie is played to a particular time node, execute the scene atmosphere event corresponding to the time node according to the configuration file.

By means of work of the loading module 901 and the execution module 902, the apparatus for adjusting a VR scene may add an atmosphere event matching the played movie and television work to the VR theme-scene.

Specific principles for implementing the functions of the foregoing modules are previously described in FIG. 5, and details are not described herein again.

Figure 7:
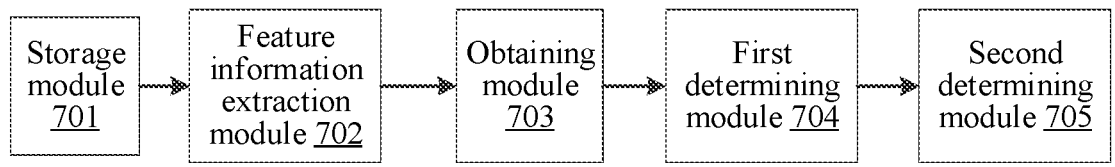
FIG. 7 is a structure diagram of an apparatus for adjusting a VR scene according to an embodiment of the present disclosure.

In addition, in the present disclosure, the apparatus for adjusting a VR scene may include both the modules shown in FIG. 7 and the modules shown in FIG. 8, and synchronously implement automatic adaption and color adjustment of the VR theme-scene. Alternatively, the apparatus for adjusting a VR scene may include both the modules shown in FIG. 8 and the modules shown in FIG. 9, and synchronously implement color adjustment of the VR theme-scene and addition of an atmosphere event synchronous with the movie and television work. Alternatively, the apparatus for adjusting a VR scene may include both the modules shown in FIG. 7 and the modules shown in FIG. 8 and FIG. 9, and synchronously implement automatic adaption and color adjustment of the VR theme-scene, and addition of an atmosphere event synchronous with the movie and television work.

In addition, the methods for adjusting a VR scene, and the apparatuses for adjusting a VR scene and modules therein in the embodiments of the present disclosure may be integrated in one processing unit, or each of the modules may exist alone physically, or two or more apparatuses or modules are integrated in one unit. The integrated unit may be implemented in the form of hardware, or may be implemented in the form of a software functional unit.

In an example, the apparatus for adjusting a VR scene may run in various computing devices that can perform user information processing based on the Internet, and is loaded into a memory of the computing device.

Figure 10:
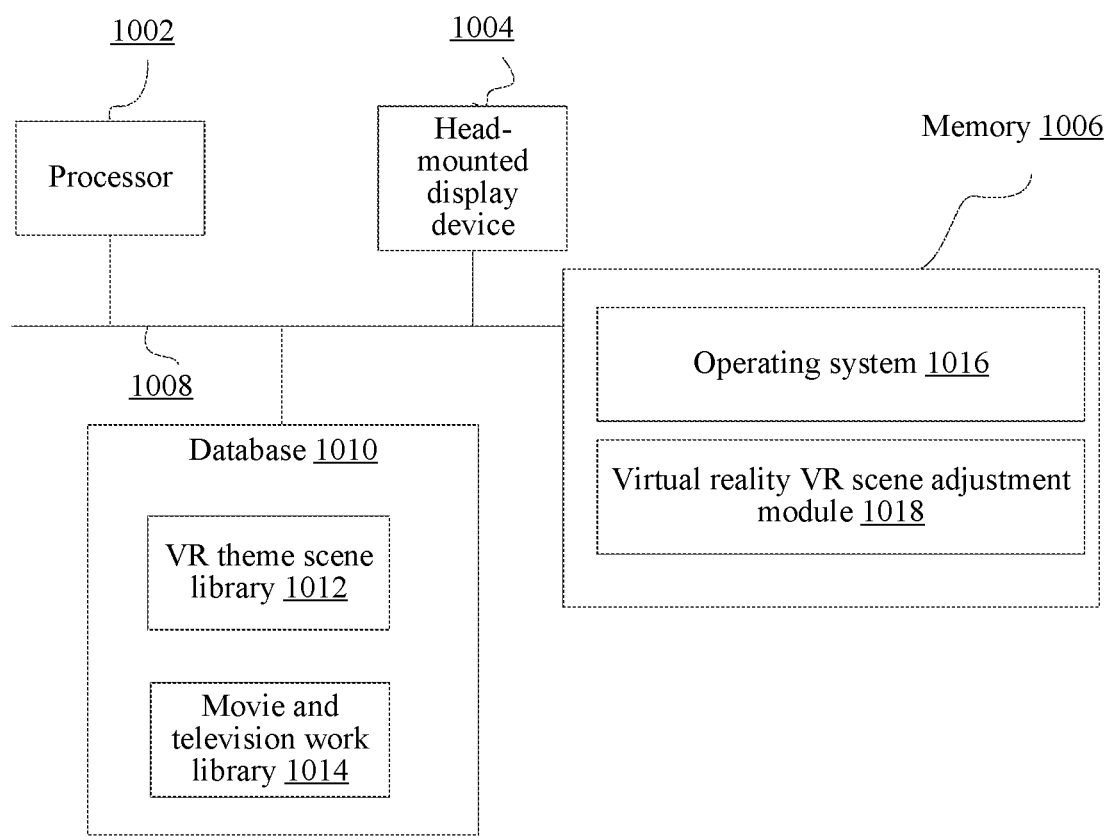
FIG. 10 is a hardware structural diagram of an apparatus for adjusting a VR scene according to an embodiment of the present disclosure.

A hardware structural diagram of an apparatus for adjusting a VR scene is shown in FIG. 10. As shown in FIG. 10, the apparatus for adjusting a VR scene includes one or more processors (CPU) 1002, a head-mounted display device 1004, a memory 1006, a database 1010, and a connection apparatus 1008 configured to interconnect these components. In addition to the case shown in FIG. 10, the database 1010 may be implemented by an independent device independent of the apparatus for adjusting a VR scene. In this case, the apparatus for adjusting a VR scene may establish a connection to the database 1010 by using a wired or wireless network, to read data from the database.

The processor 1002 may receive and send data by using the head-mounted display device 1004, to implement network communication and/or local communication.

The head-mounted display device 1004 may play a movie and television work selected by a user for play and a VR theme-scene. In some examples, the head-mounted display device 1004 may present 2D, 3D, and other effects.

The head-mounted display device 1004 may be an external head-mounted display device, an integral head-mounted display device, or a mobile end head-mounted display device.

The database 1010 may be a VR theme-scene library 1012 or a movie and television work library 1014. The database 1010 may further include a configuration file library corresponding to the movie and television work.

The memory 1006 may be a high speed random access memory such as a DRAM, an SRAM, a DDR RAM, or another random access solid-state storage device; a non-volatile memory, such as one or more magnetic disk storage devices, optical disk storage devices, and flash memory devices, or other non-volatile solid-state storage devices.

The memory 1006 stores an instruction set that can be executed by the memory 1002, and includes: an operating system 1016, including programs for processing various basic system services and executing hardware related tasks; and a VR scene adjustment module 1018, including various application programs for implementing functions of automatically adapting a VR theme-scene, changing colors of a scene, and matching a scene atmosphere event. These application programs can implement processing flows in the foregoing examples.

The VR scene adjustment module 1018 specifically includes the following instruction modules: a storage module 701 configured to automatically adapt a VR theme-scene, a feature information extraction module 702, an obtaining module 703, a first determining module 704, a second determining module 705, and/or a color collection module 801 configured to change colors of a VR theme-scene, an analog module 802, a replacement module 803, and/or a loading module 901 configured to add an atmosphere event, and an execution module 902.

The processor 1002 executes machine executable instructions in the modules 701-705, 801-803, and 901-902 in the memory 1006, so as to implement the functions in the modules 701-705, 801-803, and 901-902.

In addition, each embodiment of the present disclosure may be implemented by a data processing program executed by a data processing device such as a computer. Apparently, data processing programs constitutes the present disclosure. In addition, generally, a data processing program stored in a storage medium is directly read from the storage medium for execution or the program is installed on or replicated to a storage device (such as a hard disk or a memory) of a data processing device for execution. Therefore, such a storage medium also constitutes the present disclosure. The storage medium may use any type of recording manner, such as a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further discloses a non-volatile storage medium storing a data processing program. The data processing program is used for executing any example of the foregoing method of the present disclosure.

In addition, the method steps of the present disclosure not only may be implemented by using data processing programs, but also may be implemented by hardware, such as a logic gate, a switch, an application-specific integrated circuit (ASIC), a programmable logic controller, and an embedded microcontroller. Therefore, this hardware that can implement the method of the present disclosure may also constitute the present disclosure.

The foregoing descriptions are merely preferred embodiments of the present disclosure, and are not intended to limit the present disclosure. Any modification, equivalent replacement, improvement and the like made within the spirit and principle of the present disclosure should fall within the protection scope of the present disclosure.

What is claimed is:

1. A method for adjusting a virtual reality (VR) scene, comprising:
   obtaining a movie and television work selected by a user to be played;
   determining a VR theme-scene of the movie and television work;
   after the movie and television work starts being played, collecting colors of n points on the played movie and television work to obtain color code parameters of the n points, wherein n is a natural number greater than or equal to 2;
   generating a parameter of a dynamic light source according to the color code parameters of the n points; and
   replacing a current parameter of the dynamic light source in the VR theme-scene with the generated parameter of the dynamic light source.

2. The method according to claim 1, comprising:
   pre-storing a plurality of VR theme-scenes, and determining feature information corresponding to the VR theme-scenes;
   determining feature information of the selected movie and television work; and
   determining the VR theme-scene corresponding to the selected movie and television work from the plurality of VR theme-scenes, according to the feature information of the selected movie and television work and the feature information of the VR theme-scene.

3. The method according to claim 2, further comprising:
   loading a configuration file of the movie and television work, wherein the configuration file comprises a time node and a corresponding scene atmosphere event; and
   when the movie and television work is played to a particular time node, executing the scene atmosphere event corresponding to the time node according to the configuration file.

4. The method according to claim 2, wherein:
   the feature information is a category identifier; and
   the determining the VR theme-scene corresponding to the selected movie and television work from the plurality of VR theme-scenes comprises:
   selecting, from the pre-stored VR theme-scenes, a VR theme-scene having a category identifier the same as that of the selected movie and television work.

5. The method according to claim 4, wherein the selecting a VR theme-scene having a category identifier the same as that of the selected movie and television work comprises:
   determining the number of VR theme-scenes having a category identifier the same as that of the selected movie and television work;
   when the number is 1, directly using the VR theme-scene as the VR theme-scene corresponding to the selected movie and television work; and
   when the number is greater than 1, randomly selecting a VR theme-scene from the VR theme-scenes having the category identifier the same as that of the selected movie and television work as the VR theme-scene corresponding to the selected movie and television work.

6. The method according to claim 2, wherein:
   the feature information is a label; and
   the determining the VR theme-scene corresponding to the selected movie and television work from the plurality of VR theme-scenes comprises:
   selecting, from the pre-stored VR theme-scenes, a VR theme-scene having a label the same as that of the selected movie and television work.

7. The method according to claim 6, wherein the selecting a VR theme-scene having a label the same as that of the selected movie and television work comprises:
   determining the number of VR theme-scenes having a label the same as that of the selected movie and television work;
   when the number is 1, directly using the VR theme-scene as the VR theme-scene corresponding to the selected movie and television work; and
   when the number is greater than 1, randomly selecting a VR theme-scene from the VR theme-scenes having the label the same as that of the selected movie and television work as the VR theme-scene corresponding to the selected movie and television work.

8. The method according to claim 2, wherein:
   the feature information comprises a category identifier and a label; and
   the determining the VR theme-scene corresponding to the selected movie and television work from the plurality of VR theme-scenes comprises:
   selecting, from the pre-stored VR theme-scenes, a VR theme-scene having a category identifier the same as that of the selected movie and television work; and
   selecting, from VR theme-scenes having a category identifier the same as that of the selected movie and television work, a VR theme-scene having a same label.

9. The method according to claim 1, wherein
   the collecting colors of n points comprises:
   periodically collecting the colors of the n points;
   the generating a parameter of a dynamic light source comprises:
   periodically generating the parameter of the dynamic light source according to the color code parameters of the n points; and
   the replacing a current parameter of the dynamic light source in the VR theme-scene comprises:
   periodically replacing all the current parameters of the dynamic light source in the VR theme-scene with the generated parameter of the dynamic light source.

10. An apparatus for adjusting a virtual reality (VR) scene, comprising:
  one or more memories storing computer instructions; and
  one or more processors coupled to the memories and, when executing the computer instruction, configured to perform:
  obtaining a movie and television work selected by a user to be played;
  determining a VR theme-scene of the movie and television work;
  after the movie and television work starts being played, collecting colors of n points on the played movie and television work to obtain color code parameters of the n points, wherein n is a natural number greater than or equal to 2;
  generating a parameter of a dynamic light source according to the color code parameters of the n points; and
  replacing a current parameter of the dynamic light source in the VR theme-scene with the generated parameter of the dynamic light source.

11. The apparatus according to claim 10, wherein the one or more processors are further configured to perform:
  pre-storing a plurality of VR theme-scenes, and determining feature information corresponding to the VR theme-scenes;
  determining feature information of the selected movie and television work; and
  determining the VR theme-scene corresponding to the selected movie and television work from the plurality of VR theme-scenes, according to the feature information of the selected movie and television work and the feature information of the VR theme-scene.

12. The apparatus according to claim 11, wherein:
  the feature information is a category identifier; and
  the determining the VR theme-scene corresponding to the selected movie and television work from the plurality of VR theme-scenes comprises:
  selecting, from the pre-stored VR theme-scenes, a VR theme-scene having a category identifier the same as that of the selected movie and television work.

13. The apparatus according to claim 12, wherein the selecting a VR theme-scene having a category identifier the same as that of the selected movie and television work comprises:
  determining the number of VR theme-scenes having a category identifier the same as that of the selected movie and television work;
  when the number is 1, directly using the VR theme-scene as the VR theme-scene corresponding to the selected movie and television work; and
  when the number is greater than 1, randomly selecting a VR theme-scene from the VR theme-scenes having the category identifier the same as that of the selected movie and television work as the VR theme-scene corresponding to the selected movie and television work.

14. The apparatus according to claim 11, wherein:
  the feature information is a label; and
  the determining the VR theme-scene corresponding to the selected movie and television work from the plurality of VR theme-scenes comprises:
  selecting, from the pre-stored VR theme-scenes, a VR theme-scene having a label the same as that of the selected movie and television work.

15. The apparatus according to claim 14, wherein the selecting a VR theme-scene having a label the same as that of the selected movie and television work comprises:
  determining the number of VR theme-scenes having a label the same as that of the selected movie and television work;
  when the number is 1, directly using the VR theme-scene as the VR theme-scene corresponding to the selected movie and television work; and
  when the number is greater than 1, randomly selecting a VR theme-scene from the VR theme-scenes having the label the same as that of the selected movie and television work as the VR theme-scene corresponding to the selected movie and television work.

16. The apparatus according to claim 11, wherein:
  the feature information comprises a category identifier and a label; and
  the determining the VR theme-scene corresponding to the selected movie and television work from the plurality of VR theme-scenes comprises:
  selecting, from the pre-stored VR theme-scenes, a VR theme-scene having a category identifier the same as that of the selected movie and television work; and
  selecting, from VR theme-scenes having a category identifier the same as that of the selected movie and television work, a VR theme-scene having a same label.

17. The apparatus according to claim 11, wherein the processors are further configured to perform:
  loading a configuration file of the movie and television work, wherein the configuration file comprises a time node and a corresponding scene atmosphere event; and
  when the movie and television work is played to a particular time node, executing the scene atmosphere event corresponding to the time node according to the configuration file.

18. The apparatus according to claim 10, wherein
  the collecting colors of n points comprises:
  periodically collecting the colors of the n points;
  the generating a parameter of a dynamic light source comprises:
  periodically generating the parameter of the dynamic light source according to the color code parameters of the n points; and
  the replacing a current parameter of the dynamic light source in the VR theme-scene comprises:
  periodically replacing all the current parameters of the dynamic light source in the VR theme-scene with the generated parameter of the dynamic light source.

19. A non-transitory computer readable storage medium, storing computer instructions that, when being executed by a processor, cause the processor to perform:
  obtaining a movie and television work selected by a user to be played;
  determining a VR theme-scene of the movie and television work;
  after the movie and television work starts being played, collecting colors of n points on the played movie and television work to obtain color code parameters of the n points, wherein n is a natural number greater than or equal to 2;
  generating a parameter of a dynamic light source according to the color code parameters of the n points; and
  replacing a current parameter of the dynamic light source in the VR theme-scene with the generated parameter of the dynamic light source.

20. The storage medium according to claim 19, wherein:
  the collecting colors of n points comprises: periodically collecting the colors of the n points;

the generating a parameter of a dynamic light source comprises: periodically generating the parameter of the dynamic light source according to the color code parameters of the n points; and the replacing current parameters of the dynamic light source in the VR theme-scene comprises: periodically replacing all the current parameters of the dynamic light source in the VR theme-scene with the generated parameter of the dynamic light source.

* * * * *